United States Patent
> Stratman

[15] 3,674,051
[45] July 4, 1972

[54] HYDRAULIC COUPLER
[72] Inventor: Paul E. Stratman, Golden Valley, Minn.
[73] Assignee: Safe Way Hydraulics, Inc., Minneapolis, Minn.
[22] Filed: May 14, 1971
[21] Appl. No.: 143,323

[52] U.S. Cl................137/614.04, 137/614.02, 137/614.06
[51] Int. Cl........................................F16l 29/00, F16l 37/28
[58] Field of Search..........137/614, 614.01, 614.02, 614.03, 137/614.04, 614.05, 614.06

[56] References Cited

UNITED STATES PATENTS 3,474,827  10/1969  Torres ..............................137/614.06
3,314,447  4/1967  Collar................................137/614.06
3,097,867  7/1963  Saloum.............................137/614.03
3,076,671  2/1963  Freeman...........................137/614.04

Primary Examiner—M. Cary Nelson
Assistant Examiner—William H. Wright

[57] ABSTRACT

A conduit terminating in a female body at one end and a source of hydraulic power at the other, and a conduit terminating in a male tip at one end and an hydraulically actuated mechanism at the other, are connected together by inserting the tip into the body with hydraulic pressure existent in both conduits, in one or the other conduit, or in neither conduit. The body has a releasable latching mechanism for securing the tip in place.

12 Claims, 10 Drawing Figures

INVENTOR.
Paul E. Stratman
BY
Thomas G. Devine
ATTORNEY

INVENTOR.
Paul E. Stratman
BY
Thomas G. Devine
ATTORNEY

INVENTOR.
Paul E. Stratman
BY
Thomas G. Devine
ATTORNEY

HYDRAULIC COUPLER

BACKGROUND OF THE INVENTION

Hydraulically operated machinery requires a facility for being coupled to and uncoupled from a source of hydraulic power. Through design or otherwise, the situation often arises where the uncoupling occurs when there is pressure existent from the hydraulic source. It is important that neither the female body of the hydraulic coupler nor the male tip be damaged by the uncoupling and the subsequent coupling, that hydraulic fluid not be lost, and that the coupling be accomplished with a minimum of physical effort and with simplicity.

Hydraulic couplers commonly use ball-type check valves which are urged into their respective seats by resiliant means, usually springs. In prior art couplers, it has been found to be quite difficult to uncouple when pressure from the hydraulic power source is existent as well as pressure from the mechanism. Additionally, when pressure has been existent from the source, it has been impossible to perform the coupling. Prior to attempting a connection, the hydraulic power source had to be turned off.

There has been at least one prior art effort to enable coupling with pressure from the hydraulic source existent as well as pressure from the hydraulically actuated mechanism. This prior art is taught in U.S. Pat. No. 3,431,942. One difficulty encountered in that structure or in any ball valve and seat structure is that upon uncoupling, some hydraulic fluid passes between the closing ball valve and its seat in the finite time that it takes to complete the seal. This results in hydraulic fluid ultimately filling the body so that when it is attempted to insert the tip, insertion is physically impossible because of the incompressibility of the trapped oil. My invention, as will be described later, eliminates this problem.

BRIEF SUMMARY OF THE INVENTION

Typically, a female body is attached to a hydraulic conduit which in turn is attached to a source of hydraulic power such as a pump. A male tip is attached to a second hydraulic conduit which in turn is attached to a hydraulically actuated mechanism. The male tip is inserted into the female body, thus enabling hydraulic pressure from the pump to be transmitted to the mechanism for actuation of that mechanism. The coupling mechanism, comprising the female body and the male tip, has a latching mechanism for securing the tip within the body. The body is provided with seals to avoid leakage of the hydraulic fluid and one of the seals provides a wiping action to direct trapped hydraulic fluid to the surface of the body. The latching mechanism is releasable, permitting uncoupling of the coupler. Valves are provided in the body and in the tip that close upon uncoupling to avoid loss of hydraulic fluid.

The uncoupling may take place when there is pressure at the body from the hydraulic power source and there is pressure existent at the tip from the hydraulically actuated mechanism. This coupler permits insertion of the tip into the body under these circumstances without any other steps required. If, for example, there is hydraulic fluid within the body when the tip is inserted, complete insertion of the tip forces such hydraulic fluid to the surface of the body. There is no requirement for first draining the body of any such trapped oil. Further, the hydraulic power source need not be turned off prior to complete insertion of the tip.

An object of this invention is to provide an hydraulic coupler that is capable of being coupled and uncoupled when either conduit contains hydraulic fluid under pressure, or when both conduits contain hydraulic fluid under pressure, or when neither contain hydraulic fluid under pressure.

Another object of this invention is to provide an exhaust route for hydraulic fluid trapped in the body prior to coupling.

Still another object of this invention is to provide a seal for minimizing loss of hydraulic fluid upon uncoupling but to permit any fluid trapped in the body to pass into the escape route.

Other objects of this invention will be made evident by the detailed description that follows.

DETAILED DESCRIPTION OF THE INVENTION

Figure 1:
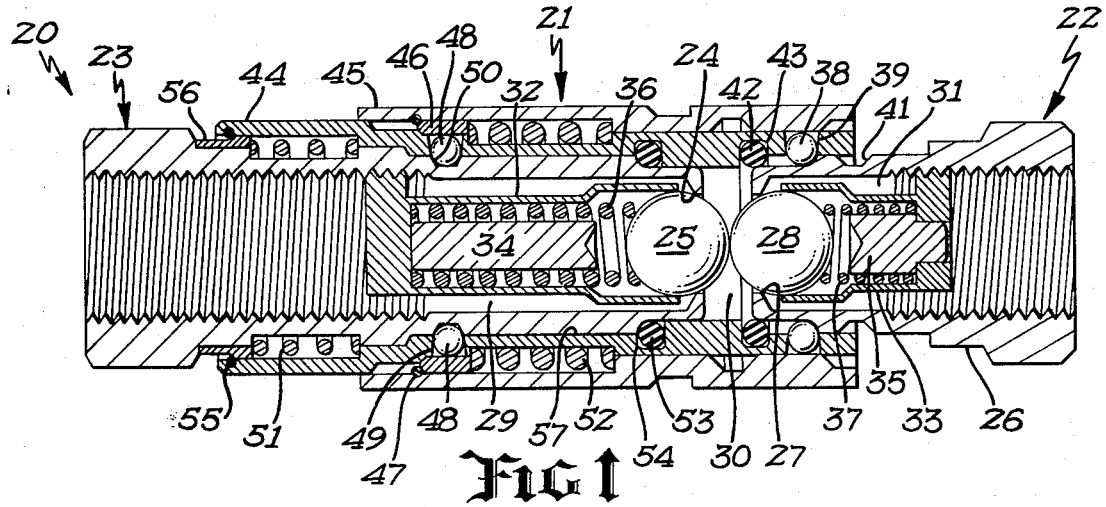
FIG. 1 is a longitudinal, central sectional view of the coupler 20 showing the tip 22 having been partially inserted into the body 21.

Reference should be made to FIGS. 1–6 for an understanding of the detailed makeup of the improved coupler 20. FIGS. 1–6 are of the same mechanism, but under different conditions and at different times. An understanding of these variations will be readily accomplished by reading the "MODE OF OPERATION" that follows.

A coupler 20 is comprised of a female body 21 and a male tip 22. The body 21 is connected to a conduit (not shown) which may be connected to a source of hydraulic power. The tip 22 is connected to a conduit (not shown) which may be connected to an hydraulically-actuated mechanism.

The tip 22 has a tip latching cylinder 26 which terminates in tip valve seat 27. Tip passage 31 through which the hydraulic fluid flows is bored through the length of tip latching cylinder 26. A ball valve 28 is contained within tip passage 31 and is contacted by tip ball spring 37 to urge ball valve 28 against tip valve seat 27. Tip valve shield 33 is threaded into tip latching cylinder 26, partially surrounding tip ball valve 28. Tip ball stop 35 contacts tip ball valve 28 at one end and hydraulic fluid at the other, and is surrounded by tip ball spring 37. Tip detents 38 are provided for locking insertion into tip detent groove 41 of tip latching cylinder 26. Tip detents 38 are maintained in locking contact with tip detent apertures 39 which are radial holes provided in locking collar 44 of female body 21. Tip seal 42 is an annular ring seated in tip seal groove 43 which is an annular groove in the locking collar 44. Locking collar 44 is movably mounted on body latching cylinder 23 of female body 21.

Body seal 53 is an annular ring seated in body seal groove 54 of locking collar 44. Body seal 53 minimizes loss of fluid upon uncoupling but, upon coupling, permits any excess oil left within body 21 to pass to the surface of body 21 when tip 22 is inserted as far as possible.

Body 21 is provided with most of the moving parts which enable the insertion of tip 22 under any combinations of hydraulic pressure. As a point of reference, assume that locking collar 44 is stationary. Then sleeve 45 is slidably mounted on locking collar 44 and is capable of being moved in either direction relative thereto. Body latching cylinder 23 is also slidably mounted with respect to locking collar 44. Lock ring 47 secures slide 46 to locking collar 44. In turn, slide 46 maintains body detents 48 in place in body detent groove 50 of body latching cylinder 23 and body detent apertures 49 of locking collar 44 (as shown in FIG. 1) securing body latching cylinder 23 to the locking collar 44. Body passage 29, through which the hydraulic fluid passes, is bored through body latching cylinder 23. Body valve shield 32 is threaded into body latching cylinder 23 and terminates, within body passage 29, in body valve seat 24. Body ball valve 25 is urged against body valve seat 24 by body ball spring 36 which surrounds body ball stop 34. Body ball stop 34 bears against body ball valve 25 at one end and is exposed to the hydraulic fluid at the other.

Snap ring 55 secures cylinder spring retainer 56 to locking collar 44 and retainer 56 holds cylinder spring 51 in place. Cylinder spring 51 is stronger than body ball spring 36 but not as strong as sleeve spring 52, for reasons that will be made apparent in the "MODE OF OPERATION" that follows.

MODE OF OPERATION

The first mode of operation to be described involves that when the tip 22 is subjected to hydraulic pressure and body 21 is subjected to hydraulic pressure. FIG. 1 illustrates the beginning of the insertion of tip 22 into body 21.

In actual practice, it is customary, although not necessary, to mount sleeve 45 in a fixed bracket. All other movement then is relative to the locked sleeve 45. However, for purposes of illustration, assume that locking collar 44 remains motionless so that all other movement is relative to it, including movement of sleeve 45.

Figure 2:
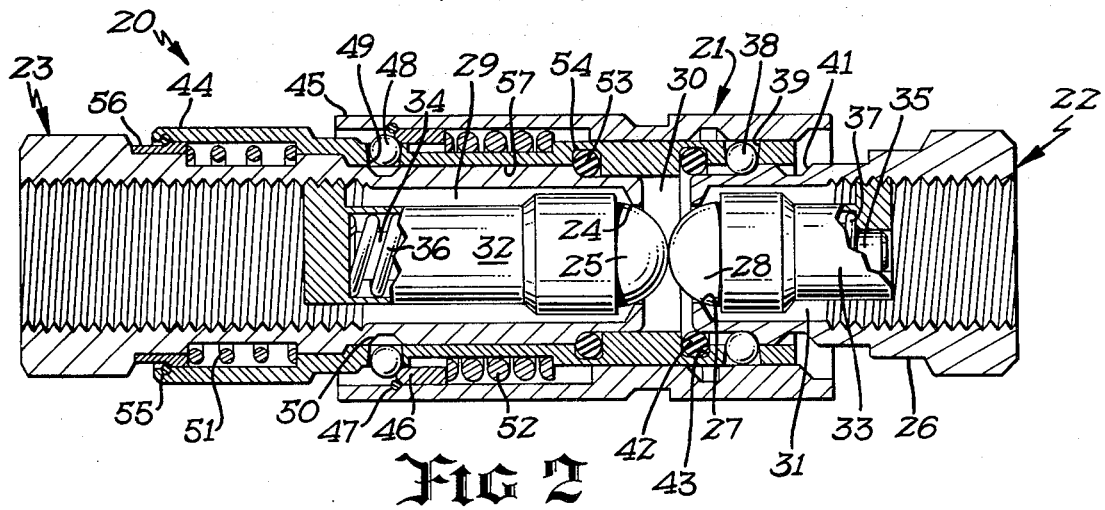
FIG. 2 is a view similar to FIG. 1 except that the tip 22 has been inserted further into body 21.

FIG. 2 illustrates sleeve 45 being moved to the right which results in motion to the right of slide 46 which is connected to sleeve 45 through lock ring 47. Body detent 48 (one of a plurality, each having its own body detent aperture 49 in locking collar 44) is moved out of body detent groove 50. Sleeve spring 52 is compressed by the motion to the right of sleeve 45 which is accomplish by further insertion of tip 22. It should be noted that body ball valve 25 is in contact with its valve seat 24 and tip ball valve 28 is in contact with its seat 27. Valve 25 is urged into contact with seat 24 by spring 36 and by hydraulic pressure generally, transmitted from the hydraulic source. Valve 28, similarly, is urged into contact with its seat 26 by spring 37 and hydraulic pressure generally, transmitted from the hydraulically actuated mechanism.

Figure 3:
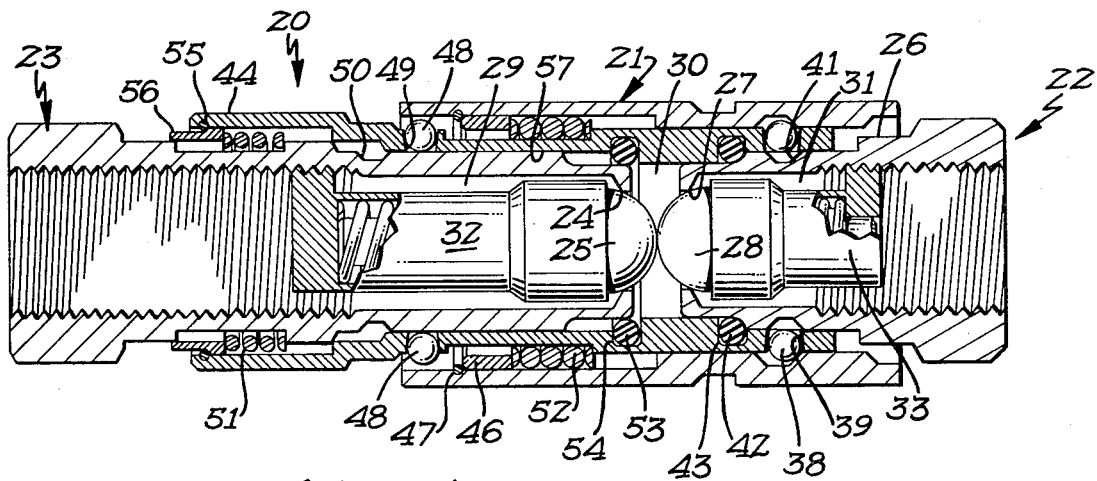
FIG. 3 is a view similar to FIG. 2 except later in time, showing the tip 22 being still further inserted into the body 21. This view is pertinent when there is hydraulic pressure present at the body 21 and at the tip 22.

FIG. 3 illustrates a further step in the connection procedure. Tip 22 is shown having been fully inserted into body 21 resulting in tip ball valve 28 bearing against body ball valve 25 which in turn bears against body ball spring 36. Spring 36 together with the hydraulic pressure transmitted overcomes cylinder spring 51 and therefore the force exerted against body ball valve 25 results in body latching cylinder 23, together with body valve shield 32, body ball stop 34, body ball spring 36 and body ball valve 25 being moved to the left against the force of spring 51, resulting in the compression of spring 51. At the same time, tip detents 38 are moved to the left until tip detent apertures 39 are aligned with tip detent groove 41. Through this series of motions, it is important to note that valves 25 and 28 have remained in seats 24 and 27 respectively. Also, if trapped hydraulic fluid were present in body receptacle 30, body seal 53 permits such trapped fluid to pass into escape route 57 when the tip 22 has been inserted as far as possible, the fluid then moving to the surface of body 21 through convenient ports such as apertures 49.

Figure 4A:
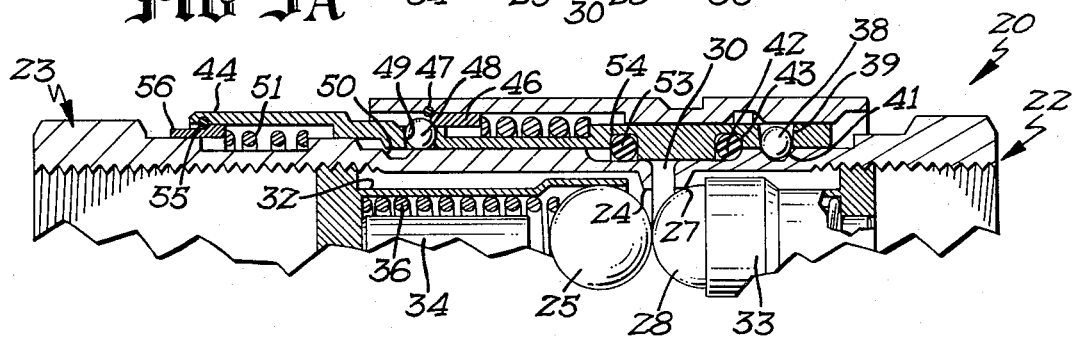
FIG. 4A is a cross-sectional view identical to FIG. 4 except that it illustrates the case where there is no hydraulic pressure present at the body 21 but there is hydraulic pressure present at the tip 22.
Figure 4B:
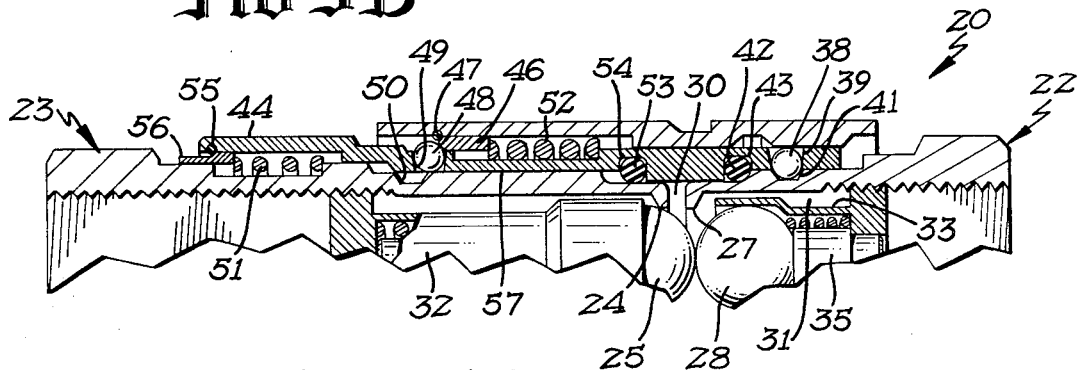
FIG. 4B is a cross-sectional view identical to FIG. 4 except that it illustrates the case where there is hydraulic pressure present at the body 21 but there is no hydraulic pressure present at the tip 22.
Figure 4:
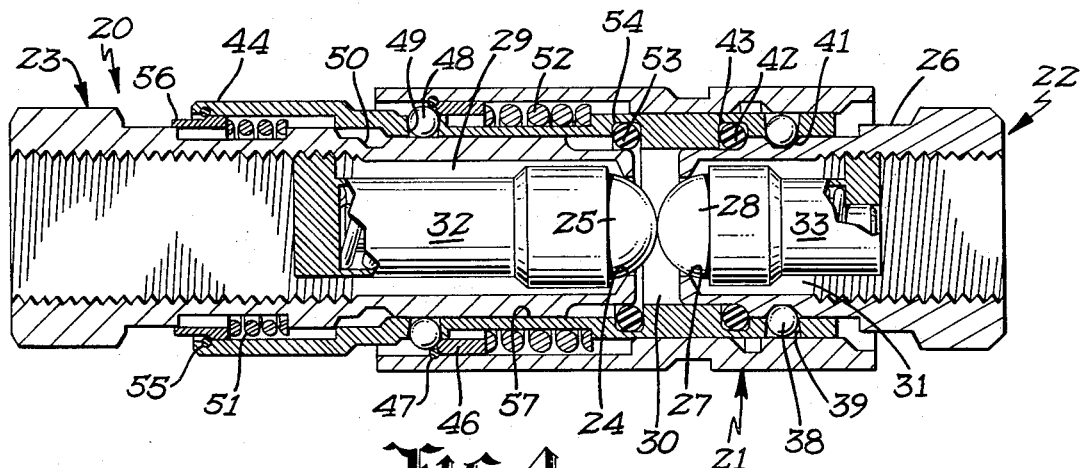
FIG. 4 is a sectional view similar to FIG. 3, still later in time, illustrating the locking action between the body 21 and the tip 22.

FIG. 4 illustrates tip detents 38 in place in tip detent groove 41 and in tip detent apertures 39, locking tip 22 in place within body 21. The hand insertion of tip 22 has been stopped and therefore sleeve spring 52 begins pushing sleeve 45 to the left.

Figure 5:
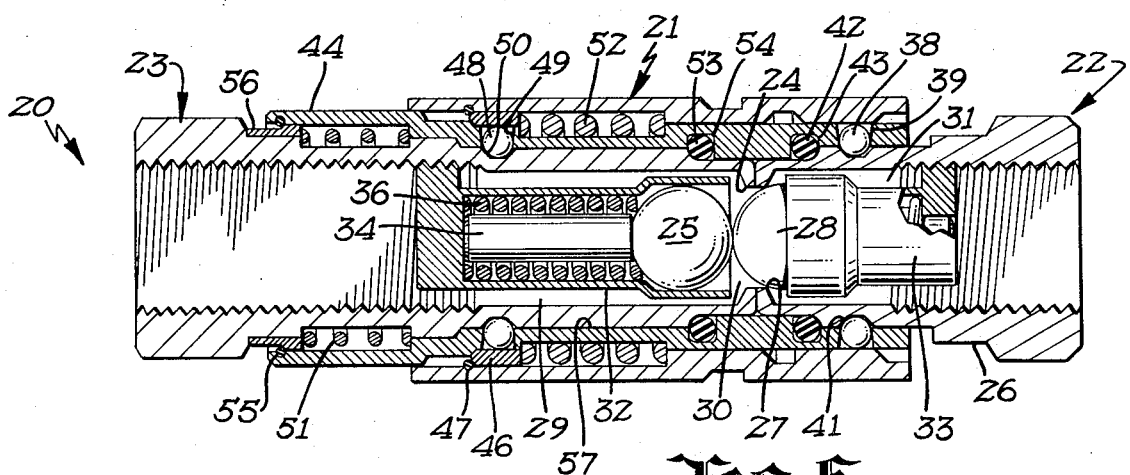
FIG. 5 is a sectional view, similar to FIG. 4, but illustrating the pressure on the body 21 having been removed and the locking collar 44 having been locked to the body latching cylinder 23.

FIG. 5 illustrates sleeve 45 having moved still further to the left so that body detent apertures 49 line up with body detent groove 50 permitting body detents 48 to move into body detent groove 50 and to be retained therein by slide 46 which has been moved to the left by sleeve 45. Since the tip 22 was released, compressed cylinder spring 51 pushes body latching cylinder 23 to the right, compressing body ball spring 36. Body ball spring 36 is susceptible of compression in this manner only when the source pressure has been removed. In a typical application, the improved hydraulic coupler is in one hydraulic line which completes one path from the source of hydraulic power to the hydraulically actuated mechanism to be activated. Another line and improved hydraulic coupler form the return path from the mechanism to the source of hydraulic power. After a separation of one of the improved couplers, it is connected, without regard to whether there is pressure on each side of the coupler or not. However, if the mechanism does not work, the operator simply turns a valve in the hydraulic line which then relieves the source pressure. When the source pressure is relieved, the compressed cylinder spring 51, which is stronger than body ball spring 36, pushes body latching cylinder 23 to the right compressing body ball spring 36. This motion of body latching cylinder 23 also moves body valve seat 24 away from body ball valve 25 thus permitting flow of hydraulic fluid past body ball valve 25 when the source pressure is again present by the operator simply turning the source valve in the opposite direction.

Figure 6:
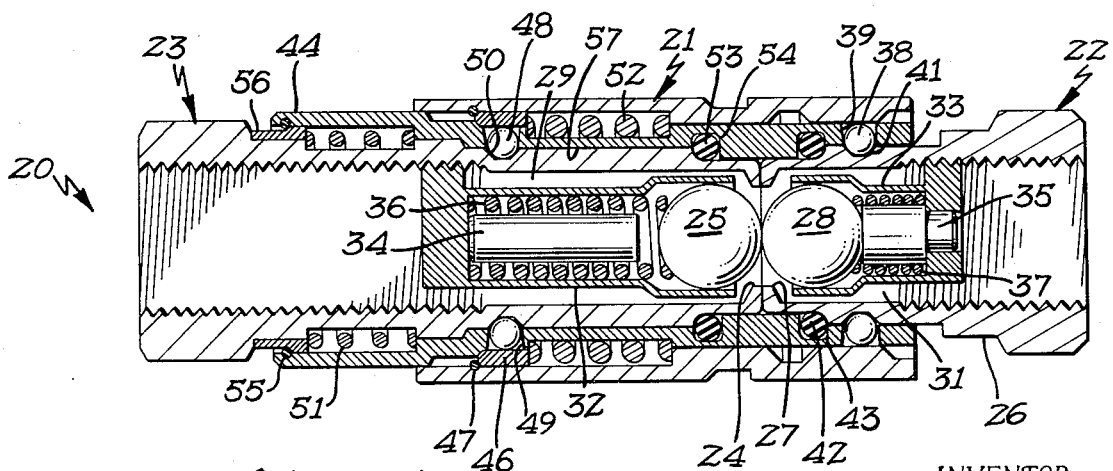
FIG. 6 is still another similar sectional view, illustrating the full flow state of the coupler.

FIG. 6 illustrates the improved coupler 20 in balanced operation with tip 22 securely locked in place within body 21. Body ball spring 36 is stronger than tip ball spring 37 and together with the pressure from the hydraulic fluid flowing around body ball valve 25 and past seat 24 easily pushes tip ball valve 28 away from seat 27 against the weaker tip ball spring thus permitting full flow.

In a situation where there is no hydraulic pressure on the body 21, but hydraulic pressure is present on tip 22, fitting the assembly together requires somewhat different internal action than described above. With respect to FIG. 1 and FIG. 2, the action is the same as described above which amounts to the first insertion of the tip 22 into body 21 in a relative motion to the right of sleeve 45 resulting in moving body detents 48 out of body detent groove 50 and completely into body detent apertures 49.

Figure 3A:
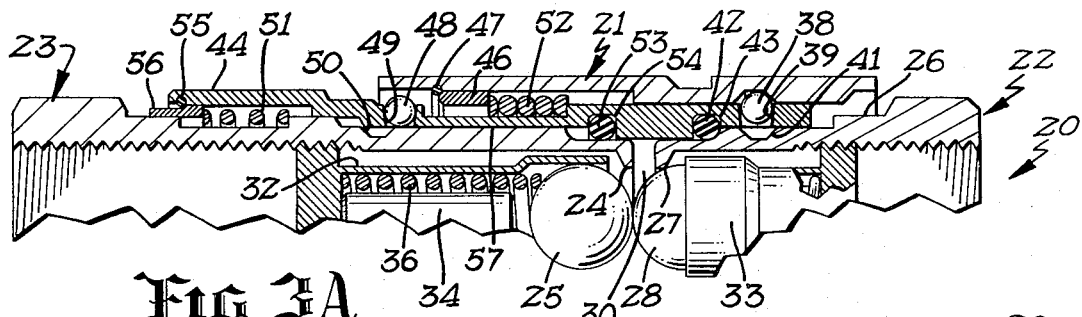
FIG. 3A is a cross-sectional view, identical to FIG. 3 except that it illustrates the case when there is no hydraulic pressure present at the body 21 but there is hydraulic pressure present at the tip 22.

FIG. 3A illustrates tip 22 being moved further into place within body 21. Because of the fluid pressure against tip ball stop 35 together with the force of tip ball spring 37, each bearing against tip ball valve 28, make tip ball 28 in its seat 27 more or less rigid with respect to body ball valve 25 and its associated parts. Therefore, when the tip is inserted further, it forces body ball valve 25 back away from its seat 24.

FIG. 4A illustrates the tip detents 38 in place within the tip detent groove 41 and within each tip detent aperture 39, locking the tip 22 in place. Sleeve 45 is shown having been moved further to the left by sleeve spring 52, in a position just preliminary to body detents 48 moving into body detent groove 50.

FIG. 5 illustrates body detents 48 in place in the body detent groove 50 and within body detent apertures 49.

In FIG. 6, the source pressure is turned on, as described earlier, and tip ball valve 28 is moved away from its seat 27 thus permitting full flow.

Figure 3B:
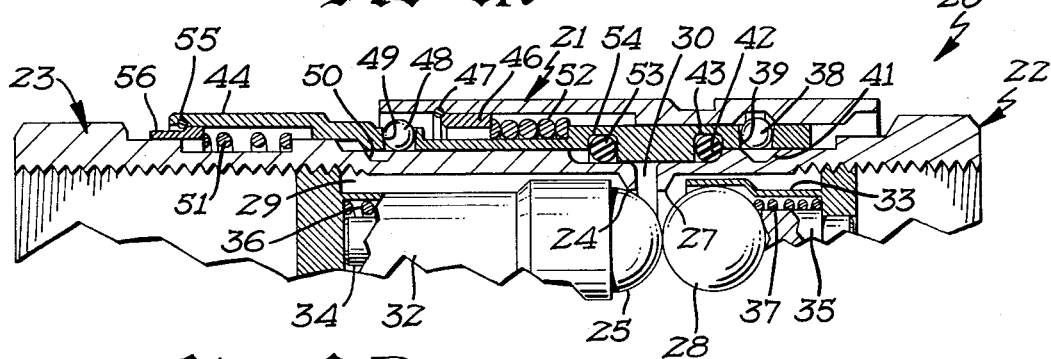
FIG. 3B is identical to FIG. 3 except that it illustrates the case where there is hydraulic pressure present at the body 21 but there is no hydraulic pressure present at the tip 22.

FIG. 3B illustrates the situation where there is source pressure present at the body and no pressure present at the tip 22. A connection is made as before and the remarks made with respect to FIGS. 1 and 2 are appropriate in this instance.

FIG. 3B illustrate the combination of pressure from the hydraulic source together with the force from body ball spring 36 making the assembly of body ball 25 in its seat 24 rigid by comparison to the mechanism within tip 22. Therefore, the tip ball valve 28 is pushed away from its seat 27 as shown in FIGS. 3B and 4B.

FIG. 5 shows body detents 48 in locked position within body detent groove 50. At this point, the operator determines that although it appears to be connected, the coupler actually is not transmitting fluid and therefore he removes the source pressure by turning the valve at the source side. As described earlier, cylinder spring 51 is now enabled to push body latching cylinder 23 to the right, compressing body ball valve spring 36 and moving body valve seat 24 away from body ball valve 25. When the source pressure is again placed on the body 21, the compressed spring 36 and the force of the hydraulic fluid passing between body ball valve 25 and seat 24 overcome tip ball valve spring 37 pushing body ball valve 25 back from body valve seat 24.

FIG. 6 illustrates the situation after the operator has again connected the source, resulting in a balanced condition as described above.

The removal of tip 22 from body 21 is accomplished by simply grasping tip 22 by hand and moving it to the right relative to sleeve 45. Sleeve 45, as mentioned earlier, is typically held rigidly and a motion of tip 22 to the right results in detents 38 being moved out of tip detent groove 41 and fully into tip detent apertures 39. Thus the tip 22 is removed and the body detents 48 remain in place within body detent groove 50.

I claim:

1. An improved coupling mechanism having locking means for locking an hydraulic fluid-carrying conduit that is connected to a source of hydraulic power to an hydraulic fluid-carrying conduit connected to an hydraulically actuated mechanism, further having a body connected to the conduit that is connected to the source and a tip connected to the other conduit, the tip being inserted into the body to effect a releasable connection therebetween, the tip and the body each having longitudinal bores therethrough and annular valve seats located within each of the bores coaxially displaced when the tip is connected within the body, a ball valve within each of the bores urged into fluid-tight contact with its respective annular valve seat by resiliant means, the improvement comprising:
   a. a latching cylinder, integral with the body valve seat, defining the bore through the body and having a body receptacle for receiving the tip;
   b. a locking collar, slidably mounted to the latching cylinder;
   c. a sleeve, slidably mounted to the locking collar to permit the latching cylinder to move with respect to the sleeve, in the direction and under the force of the tip as it is inserted into the body receptacle, and to permit the locking collar to slide on the latching cylinder, with respect to the sleeve, in the direction of and under the force of the tip as it is further inserted to permit the releasable locking means to releasably lock the body to the tip; and
   d. body locking means, to releasably lock the latching cylinder to the locking collar after the body has been locked to the tip by the releasable locking means.

2. The coupling mechanism of claim 1, further comprising:
   e. a body seal, comprising an annular ring, seated in an annular groove in the locking cylinder, making sealing contact with the latching cylinder at its end terminating in the body valve seat, to minimize loss of hydraulic fluid from the body when uncoupling is performed, and upon complete insertion of the tip into the body, to permit any of the hydraulic fluid within the body receptacle to pass into the vent defined by the inwardly facing surface of the locking collar and the outwardly facing surface of the latching cylinder.

3. The coupling mechanism of claim 1, further comprising:
   f. sleeve resiliant means, connected between the sleeve and the locking collar to resist the sliding motion of the sleeve when the tip is being inserted; and
   g. latching cylinder resiliant means, connected between the sleeve and the latching cylinder to resist the sliding motion of the latching collar when the tip is being inserted.

4. The coupling mechanism of claim 2, further comprising:
   f. sleeve resiliant means, connected between the sleeve and the locking collar to resist the sliding motion of the sleeve when the tip is being inserted; and
   g. latching cylinder resiliant means, connected between the sleeve and the latching cylinder to resist the sliding motion of the latching collar when the tip is being inserted.

5. The coupling mechanism of claim 3, wherein the sleeve resiliant means is a coil spring and the latching cylinder resilient means is a coil spring that is stronger than the resiliant means within the bore of the body.

6. The coupling mechanism of claim 4, wherein the sleeve resiliant means is a coil spring and the latching cylinder resiliant means is a coil spring that is stronger than the resiliant means within the bore of the body.

7. An improved coupling mechanism having locking means for locking an hydraulic fluid-carrying conduit that is connected to a source of hydraulic power to an hydraulic fluid-carrying conduit connected to an hydraulically actuated mechanism, further having a body connected to the conduit that is connected to the source and a tip connected to the other conduit, the tip being inserted into the body to effect a releasable connection therebetween, the tip and the body each having longitudinal bores therethrough and annular valve seats located within each of the bores coaxially displaced when the tip is connected within the body, a ball valve within each of the bores urged into fluid-tight contact with its respective annular valve seat by resiliant means, a hollow shield within the bore of each member at least partially surrounding the respective ball valve, a stop within the hollow shield of each member to limit the travel of each respective ball valve from its respective valve seat, the improvement comprising:
   a. a latching cylinder, integral with the body valve seat, defining the bore through the body and having a body receptacle for receiving the tip;
   b. a locking collar, slidably mounted to the latching cylinder;
   c. a sleeve, slidably mounted to the locking collar to permit the latching cylinder to move with respect to the sleeve, in the direction and under the force of the tip as it is inserted into the body receptacle, and to permit the locking collar to slide on the latching cylinder, with respect to the sleeve, in the direction of and under the force of the tip as it is further inserted to permit the releasable locking means to releasably lock the body to the tip; and
   d. body locking means, to releasably lock the latching cylinder to the locking collar after the body has been locked to the tip by the releasable locking means.

8. The coupling mechanism of claim 7, further comprising:
   e. a body seal, comprising an annular ring, seated in an annular groove in the locking cylinder, making sealing contact with the latching cylinder at its end terminating in the body valve seat, to minimize loss of hydraulic fluid from the body when uncoupling is performed, and upon complete insertion of the tip into the body, to permit any of the hydraulic fluid within the body receptacle to pass into the vent defined by the inwardly facing surface of the locking collar and the outwardly-facing surface of the latching cylinder.

9. The coupling mechanism of claim 7, further comprising:
   f. sleeve resiliant means, connected between the sleeve and the locking collar to resist the sliding motion of the sleeve when the tip is being inserted; and
   g. latching cylinder resiliant means, connected between the sleeve and the latching cylinder to resist the sliding motion of the latching collar when the tip is being inserted.

10. The coupling mechanism of claim 8, further comprising:
    f. sleeve resiliant means, connected between the sleeve and the locking collar to resist the sliding motion of the sleeve when the tip is being inserted; and
    g. latching cylinder resiliant means, connected between the sleeve and the latching cylinder to resist the sliding motion of the latching collar when the tip is being inserted.

11. The coupling mechanism of claim 9, wherein the sleeve resiliant means is a coil spring and the latching cylinder resiliant means is a coil spring that is stronger than the resiliant means within the bore of the body.

12. The coupling mechanism of claim 10, wherein the sleeve resiliant means is a coil spring and the latching cylinder resiliant means is a coil spring that is stronger than the resiliant means within the bore of the body.

* * * * *